(12) United States Patent
Steenbakkers-Menting et al.

(10) Patent No.: US 10,435,540 B2
(45) Date of Patent: Oct. 8, 2019

(54) FLAME RETARDANT LONG GLASS FIBRE REINFORCED POLYPROPYLENE COMPOSITION

(71) Applicant: SABIC GLOBAL TECHNOLOGIES B.V., Bergen op Zoom (NL)

(72) Inventors: Henrica Norberta Alberta Maria Steenbakkers-Menting, Susteren (NL); Roland van Giesen, Geleen (NL); Maud Corrina Willie van der Ven, Geleen (NL); Rick Robert Emilie Bercx, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/538,773

(22) PCT Filed: Dec. 16, 2015

(86) PCT No.: PCT/EP2015/080061
§ 371 (c)(1),
(2) Date: Jun. 22, 2017

(87) PCT Pub. No.: WO2016/102278
PCT Pub. Date: Jun. 30, 2016

(65) Prior Publication Data
US 2017/0349732 A1    Dec. 7, 2017

(30) Foreign Application Priority Data
Dec. 22, 2014  (EP) ..................... 14199667

(51) Int. Cl.

| | | |
|---|---|---|
| *C08K 13/04* | (2006.01) | |
| *B29B 9/14* | (2006.01) | |
| *C08J 5/04* | (2006.01) | |
| *C08J 5/08* | (2006.01) | |
| *C08J 5/10* | (2006.01) | |
| *C08L 23/14* | (2006.01) | |
| *C08L 23/10* | (2006.01) | |
| *B29B 9/06* | (2006.01) | |
| *B29K 23/00* | (2006.01) | |
| *B29K 309/08* | (2006.01) | |
| *C08K 3/22* | (2006.01) | |
| *C08K 3/32* | (2006.01) | |
| *B29C 48/05* | (2019.01) | |
| *B29C 48/04* | (2019.01) | |
| *B29C 48/00* | (2019.01) | |

(52) U.S. Cl.
CPC ............. *C08K 13/04* (2013.01); *B29B 9/14* (2013.01); *C08J 5/043* (2013.01); *C08J 5/08* (2013.01); *C08J 5/10* (2013.01); *C08L 23/10* (2013.01); *C08L 23/14* (2013.01); *B29B 9/06* (2013.01); *B29C 48/0022* (2019.02); *B29C 48/04* (2019.02); *B29C 48/05* (2019.02); *B29K 2023/12* (2013.01); *B29K 2309/08* (2013.01); *C08J 2323/10* (2013.01); *C08K 2003/2296* (2013.01); *C08K 2003/329* (2013.01); *C08L 2201/02* (2013.01); *C08L 2205/025* (2013.01)

(58) Field of Classification Search
CPC .... C08L 23/10; C08L 23/14; C08L 2205/025; C08L 2201/02; C08J 5/043; C08J 5/08; C08J 5/10; C08J 2323/10; B29K 2309/08; B29K 2023/12; C08K 13/04; C08K 2003/2296; C08K 2003/329; B29C 47/0014; B29C 47/0011; B29C 47/0066; B29B 9/06; B29B 9/14
See application file for complete search history.

(56) References Cited

U.S. PATENT DOCUMENTS

| | | |
|---|---|---|
| 6,015,510 A | 1/2000 | Jacobson et al. |
| 6,737,456 B2 | 5/2004 | Bar-Yakov et al. |
| 7,049,524 B2 | 5/2006 | Belli et al. |
| 7,378,463 B2 | 5/2008 | Abu-Isa |
| 8,637,598 B2 | 1/2014 | Bernd et al. |
| 2002/0015847 A1 | 2/2002 | Shimizu et al. |
| 2010/0087573 A1 | 4/2010 | Cartier et al. |
| 2010/0313605 A1* | 12/2010 | Soliman .................. B29B 9/14 65/442 |
| 2012/0322923 A1 | 12/2012 | Wermter et al. |

(Continued)

FOREIGN PATENT DOCUMENTS

| | | |
|---|---|---|
| CA | 2284770 A1 | 10/1998 |
| CA | 2468812 A1 | 6/2003 |

(Continued)

OTHER PUBLICATIONS

Van der Veen, I., et al.; Chemosphere, 2012, vol. 88, p. 1119-1153.*
International Search Report for International Application No. PCT/EP2015/080061; International Filing Date: Dec. 16, 2015; dated Mar. 30, 2016; 4 Pages.
Liu et al., "An efficiently halogen-free flame-retardant long-glass-fiber-reinforced polypropylene system," Polymer Degradation and Stability 96 (2011) pp. 363-370.
Machine Translation of CN101418100A; Date of Publication: Apr. 29, 2009; 7 Pages.
Machine Translation of CN102492218A; Date of Publication: Jun. 13, 2012; 9 Pages.

(Continued)

*Primary Examiner* — Robert S Jones
(74) *Attorney, Agent, or Firm* — Cantor Colburn LLP

(57) ABSTRACT

The present invention relates to pellets of a flame retardant long glass fiber reinforced polypropylene composition having a core containing glass fibers and a sheath of a polypropylene compound comprising a flame retardant composition and surrounding said core, wherein the flame retardant composition comprises a mixture of an organic phosphate compound, an organic phosphoric acid compound and zinc oxide. The invention further relates to flame retardant molding compositions and articles manufactured using the pellets or the molding compositions.

17 Claims, No Drawings

(56) References Cited

U.S. PATENT DOCUMENTS

2014/0288217 A1* 9/2014 Hatanaka ............. C08K 3/22
524/100
2018/0127567 A1 5/2018 Van Der Mee et al.

FOREIGN PATENT DOCUMENTS

| CA | 2498975 A1 | 4/2004 |
|---|---|---|
| CN | 101418100 A | 4/2009 |
| CN | 102492218 A | 6/2012 |
| CN | 102516667 A | 6/2012 |
| CN | 102643478 A | 8/2012 |
| EP | 1364760 A1 | 11/2003 |
| EP | 1516907 A1 | 3/2005 |
| EP | 2410021 A1 | 1/2012 |
| JP | 2011088970 A | 5/2011 |
| JP | 2014205822 A | 10/2014 |
| NL | 1010646 C2 | 11/1999 |
| WO | 9900543 A1 | 1/1999 |
| WO | 2009080281 A1 | 7/2009 |
| WO | WO-2013084725 A1 * | 6/2013 ............. C08K 3/22 |
| WO | 2014118144 A1 | 8/2014 |
| WO | 2015051060 A1 | 4/2015 |

OTHER PUBLICATIONS

Machine Translation of CN102516667(A); Date of Publication: Jun. 27, 2012; 11 Pages.
Machine Translation of CN102643478A; Date of Publication: Aug. 22, 2012; 8 Pages.
Machine Translation of JP2014205822A; Date of Publication: Oct. 30, 2014; 72 Pages.
Mori et al., "Material Development and Applications of Chiso 'OLEACE' Halogen-Free Flame Retardant Polypropylene," From New Developments and Future Trends in Fire Safety on a Global Basis, International Conference, San Francisco, Mar. 16-19, 1997 (1997), 25-35.
Written Opinion of the International Searching Authority for International Application No. PCT/EP2015/080061; International Filing Date: Dec. 16, 2015; dated Mar. 30, 2016; 7 Pages.
English Abstract of NL1010646(C2); Date of Publication: Nov. 19, 1999; 1 Page.

* cited by examiner

FLAME RETARDANT LONG GLASS FIBRE REINFORCED POLYPROPYLENE COMPOSITION

CROSS REFERENCE TO RELATED APPLICATIONS

This application is a 371 of International Application No. PCT/EP2015/080061, filed Dec. 16, 2015, which claims priority to European Application No. 14199667.8, filed Dec. 22, 2014 which are incorporated herein by reference in their entirety.

The present invention relates to a flame retardant long glass fibre reinforced polypropylene composition. The present invention further relates to a moulding composition and to the use of the flame retardant composition or the moulding composition for the manufacture of articles, such as by moulding or extrusion.

Long glass fibre reinforced polypropylene materials are known per se and for example commercially available from SABIC Innovative Plastics under the brand name Stamax. These long glass fibre reinforced polypropylene materials are available as pellets comprising a core and a polypropylene sheath surrounding said core, wherein the core comprises glass fibres extending in a longitudinal direction of the pellet and an impregnating agent.

Methods for the manufacture of such materials are known in the prior art.

For example, WO 2009/080281 discloses a method for the manufacture of said type of long glass fibre reinforced polypropylene materials. That method comprises the subsequent steps of:
  a) unwinding from a package of at least one continuous glass multifilament strand containing at most 2% by mass of a sizing composition;
  b) applying from 0.5 to 20% by mass of an impregnating agent to said at least one continuous glass multifilament strand to form an impregnated continuous multifilament strand;
  c) applying a sheath of thermoplastic polymer around the impregnated continuous multifilament strand to form a sheathed continuous multifilament strand; characterised in that the impregnating agent is non-volatile, has a melting point of at least 20° C. below the melting point of the thermoplastic matrix, has a viscosity of from 2.5 to 100 cS at application temperature, and is compatible with the thermoplastic polymer to be reinforced.

Such a process is also referred to by the present inventors as a wire coating process, where a glass multifilament strand (i.e. the wire) is provided with a sheath (i.e. coated).

According to WO 2009/080281, the sheathed continuous glass multifilament strand may be cut into pellets having a length of from 2 to 50 mm, preferably from 5 to 30 mm, more preferably from 6 to 20 mm and most preferably from 10 to 15 mm.

The pellets can be used directly in a downstream conversion process such as injection moulding. To allow a proper dispersion of the glass fibres in such downstream conversion processes the core of the pellets not only contains the glass fibres but also what is referred to as the impregnating agent. The impregnating agent facilitates a proper dispersion of the glass fibres during the moulding of the (semi) finished article. The impregnating agent is an important component of these long glass fibre reinforced polyolefin materials.

First of all, if the dispersion of the glass fibres in the downstream process is insufficient this will result in agglomerates of glass fibres in the end product, resulting in a poor visible appearance, so called "white spots", and possibly even loss or reduction of mechanical properties.

Secondly, if the impregnating agent does not sufficiently couple the glass fibres to each other and to the polyolefin sheath then, upon subjecting the pellets to repetitive mechanical loads, glass fibres may separate from the pellets. Such repetitive mechanical loads may occur for example during transport of the pellets through a piping system. Separation of glass fibres from the pellets during transport through a piping system is undesirable because the separated filaments may cause blocking of the piping system and/or of filters, valves, outlets and the like that are used in the piping system. Such blocking may result in down time of the equipment and possible loss of production capacity. The problem of glass fibres separating from the pellet is often referred to as the "free glass" problem.

So in effect the impregnating agent has at least two key functions, the first one being to effectively couple the glass fibres to each other and to the polyolefin sheath in the pellet and the second one being to provide a sufficient dispersion of the glass fibres in downstream conversion processes.

The term "multifilament strand" as used in WO2009/080281 and the term "multifibre strand" or "continuous multifibre strand" as used herein should be regarded as synonyms and referring to the same type of material, which, in case of glass, are often also referred to as roving or glass roving.

Another process to manufacture long glass fibre reinforced polypropylene materials is based on what is known as a pultrusion process. In such a process continuous glass multifibre strands are pulled through a molten resin in such a manner that the individual filaments are fully dispersed into said resin. Examples of such processes are disclosed in EP1364760, NL1010646 and WO 2008/089963.

An important difference between pellets of pultrusion grade long glass fibre reinforced polypropylene and pellets of the long glass fibre reinforced polypropylene according to the present invention is that the glass fibres in the present invention are not dispersed in the polypropylene. This dispersion will only take place once the pellets are moulded into finished or semi-finished parts in downstream conversion processes.

An important difference between the pultrusion process and the wire coating or sheathing process of WO2009/080281 is that the pultrusion process can only run at a relatively low speed, such as in the order of 30 m/min. To the contrary the wire coating process can run at line speeds of at least 100 m/min or even at least 300 m/min.

In view of the differences between the wire-coating process and the pultrusion process the typical problems of "free glass" and "white spots" do not occur in pultrusion based pellets.

Long glass fibre reinforced polypropylene compositions are typically used in the automotive industry for both internal parts such as instrument panels, as well as for external parts such as bumper fascia. Furthermore such materials may be used for scaffolding. More recently long glass filled polypropylene materials have become the material of choice in other applications such as for example supporting structures in solar panels, such as building integrated solar or photo-voltaic panels.

Some of the aforementioned applications may require the material to have good flame retardant properties.

To that extent pultrusion grade flame retardant long glass fibre reinforced polypropylene materials are known from CN102643478 and CN102516667. These Chinese patent applications both disclose a material including inter alia 49-88.8% of polypropylene, 5-20% of a halogen-free flame retardant and 5-25% of glass fibres. Noteworthy however is that the polypropylene needs to be a high fluidity polypropylene. This high fluidity is needed as otherwise the pultrusion process cannot be applied successfully. The high fluidity of the polypropylene can only be achieved by using polypropylene having a relatively low molecular weight, corresponding to a high melt flow rate (MFR). This brings the disadvantage however that the mechanical properties of such materials are not optimal. In addition, pultrusion processes run at relatively high temperature and long residence time of the molten polypropylene (containing the flame retardant), such being disadvantageous for the effectiveness of the flame retardant composition. In addition to the foregoing CN102516667 discloses that in order to make the composition so disclosed a polypropylene composition comprising the glass fibres and a polypropylene masterbatch comprising the flame retardant are mixed.

WO2009/080281 discloses that as an optional component a flame retardant may be added to the sheath material during the wire coating. WO2009/080281 is however not specific about the type of flame retardant. In fact the present inventors have observed that some flame retardants cannot be used in the wire coating process to make good quality materials. Further to that the present inventors have observed that some flame retardants, which may effectively be used in the wire coating process, do not result in the required flame retardancy properties.

In view of the prior art it is therefore an object of the present invention to provide a long glass fibre reinforced polypropylene composition having not only good mechanical properties but also a good flame retardancy.

It is a further object of the present invention to provide a long glass fibre reinforced polypropylene composition having good mechanical properties and good flame retardancy which can be manufactured in a cost-effective manner.

First Aspect

In a first aspect the present invention is therefore directed at pellets of a flame retardant long glass fibre reinforced polypropylene composition having a core containing glass fibres and a sheath of a polypropylene compound comprising a flame retardant composition and surrounding said core, wherein the flame retardant composition comprises a mixture of an organic phosphate compound, an organic phosphoric acid compound and zinc oxide.

The present inventors have found that a flame retardant composition comprising a mixture of an organic phosphate compound, an organic phosphoric acid compound and zinc oxide can effectively be used in the wire coating process of WO2009/080281 resulting in a composition that has good mechanical properties as well as an excellent flame retardancy rating. Also, no significant difference was found in terms of white spots or free glass when compared to otherwise identical pellets, yet not containing the flame retardant composition.

Accordingly at least one of the aforementioned objects is met.

In a preferred embodiment the (pellets of the) flame retardant glass fibre reinforced polypropylene composition comprises
from 25-80 wt. % of polypropylene compound,
from 10-40 wt. % of glass fibres,
from 10-35 wt. % of a flame retardant composition,
the weight percentages being based on the weight of the flame retardant glass fibre reinforced polypropylene composition.

The present inventors have observed that the manufacture using a wire coating process of pellets having more than 40 wt. % glass fibres and containing a relatively high amount of flame retardant composition is more challenging and may disrupt a proper sheath formation.

The present inventors have further found that compositions containing more than 35 wt. % of flame retardant composition have lower mechanical properties without a further increase of flame retardancy. Below 10 wt. % of flame retardant composition no sufficient improvement of flame retardancy was observed.

For the avoidance of doubt it should be understood that the total of polypropylene compound, glass fibres, impregnating agent and flame retardant composition is 100 wt. %.

Polypropylene Compound

The polypropylene compound of the sheath contains at least polypropylene and a flame retardant composition.

The polypropylene can be a propylene homopolymer, a propylene-alpha olefin copolymer, such as a propylene-ethylene random copolymer, an impact propylene copolymer, sometimes referred to as a heterophasic propylene copolymers, or a propylene block-copolymers. Mixtures of more than one polypropylene are also possible. Which type of polypropylene is used depends on the intended application. It is preferred to use either a polypropylene homopolymer for applications requiring high stiffness or a heterophasic propylene copolymer for applications that require good stiffness in combination with good impact properties.

The polypropylene compound typically has a melt flow rate (MFR) that is significantly lower as compared to polypropylene compounds used in pultrusion processes. As such the MFR of the polypropylene compound may be from 5-100 g/10 min, preferably from 10-100 g/10 min, more preferably from 20-80 g/10 min as measured in accordance with ISO 1133 (2.16 kg, 230° C.). In an embodiment a polypropylene compound having a relatively low MFR such as from 5-50 g/10 min is used. Low MFR materials intrinsically have improved mechanical properties over high MFR polypropylene materials.

In an embodiment the polypropylene is a non-rheology controlled or non-visbroken polypropylene. Such polypropylenes are in particular of importance for automotive interior applications.

Flame Retardant Composition

The polypropylene compound further comprises a flame retardant composition comprising a mixture of an organic phosphate compound, an organic phosphoric acid compound and zinc oxide. For the avoidance of doubt the flame retardant composition is a halogen-free flame retardant composition.

In such mixture, the weight ratio of organic phosphate compound to phosphoric acid compound typically is 1:0.01 to 1:2. Preferably the weight ratio is from 1:1 to 1:2.

The organic phosphate compound in the mixture includes piperazine pyrophosphate, piperazine polyphosphate and combinations thereof.

The phosphoric acid compounds in the mixture include phosphoric acid, melamine pyrophosphate, melamine polyphosphates, melamine phosphate and combinations thereof. It is preferred that the phosphoric acid compound is melamine phosphate.

The zinc oxide is used in an amount of from 2-10 wt. %, more preferably from 3-6 wt. % based on the weight of the flame retardant composition.

An example of a commercially available flame retardant composition is ADK STAB FP-2200, available from Adeka Palmarole.

The amount of flame retardant composition is from 10-35 wt. % based on the weight of the reinforced polypropylene composition. Higher amounts, such as from 20-35 wt. % may be required for applications that need to be compliant with a UL-94 5V rating. For ULS-94 V0 ratings lower amounts may suffice.

The polypropylene compound may further contain additives and/or stabilisers like anti-oxidants, UV stabilisers, flame retardants, pigments, dyes, adhesion promoters like modified polypropylene, in particular maleated polypropylene, antistatic agents, mold release agents, nucleating agents and the like. The amount of such further materials is at most 5 wt. % based on the weight of the reinforced composition (i.e. the pellets).

For the avoidance of doubt it should be understood that the term "sheath" is to be considered as a layer that tightly accommodates the core.

Glass Fibres

The (pellets of) flame retardant long glass fibre reinforced polypropylene composition according to the present invention preferably contains from 10 to 40 wt. % of glass fibres, based on the total weight of the composition.

The long glass fibre reinforced polypropylene composition in the moulding composition of the present invention and not containing a flame retarding composition preferably contains from 10 to 70 wt. % of glass fibres, based on the total weight of the composition.

The glass fibres used in the present invention typically have a diameter in the range of from 5 to 50 micrometer, preferably from 10 to 30 micrometer such as from 15 to 25 micrometer. A thinner glass fibre generally leads to higher aspect ratio (length over diameter ratio) of the glass fibres in the final product prepared from the glass fibre reinforced composition, yet thinner glass fibres may be more difficult to manufacture and/or handle. In the method according to the present invention it is preferred that the glass fibres originate from glass multifibre strands, also referred to as glass rovings.

Preferably, the glass multifibre strand(s) or rovings contain from 500 to 10000 glass filaments per strand, more preferably from 2000 to 5000 glass filaments per strand. The linear density of the glass multifibre strand preferably is from 1000 to 5000 tex, corresponding to 1000 to 5000 grams per 1000 meter. Preferably the linear density is from 1000-3000 tex. Usually the glass fibres are circular in cross section meaning the thickness as defined above would mean diameter. Rovings are generally available and well known to the skilled person. Examples of suitable rovings are the Advantex products designated for example as SE4220, SE4230 or SE4535 and available from Binani 3B Fibre Glass company, available as 1200 or 2400 tex, or TUFRov 4575, TUFRov 4588 available from PPG Fibre Glass. Most preferably rovings are used having a linear density of 3000 tex. These commercially available rovings contain glass fibres having a small amount of sizing composition applied thereon; typically the amount of such sizing is less than 2 wt. % based on the weight of the fibers.

Pellets

The pellets of the composition according to the present invention preferably have a length of from 5 to 40 mm such as from 8 to 20 mm and preferably from 10 to 18 mm. The skilled person will understand that pellets preferably are substantially cylindrical with a circular cross section, yet other cross sectional shapes, like for example oval or (rounded) square also fall within the scope of the present invention.

In the pellets, the glass fibres generally extend in the longitudinal direction as a result of which they lie substantially in parallel to one another. The glass fibres extending in a longitudinal direction have a length of between 95% and 105%, more in particular between 99% and 101% of the length of a pellet. Ideally the length of the fibres is substantially the same as the length of the pellet, yet due to some misalignment, twisting, or process inaccuracies the length may vary within the aforementioned range.

The pellets have a core-sheath structure wherein the core contains the glass fibres and the sheath is comprised of the polypropylene compound. The core does not contain polypropylene compound.

The pellets can be manufactured with the wire-coating process according to WO2009/080281 as already explained.

Impregnating Agent

The composition of the present invention preferably contains an impregnating agent. The amount of impregnating agent may vary and is preferably from 0.5 to 7 wt. % or based on the total weight of the flame retardant long glass fibre reinforced polypropylene composition. The amount of impregnating agent may also be expressed relative to the weight of the glass fibres. Preferably the amount of impregnating agent is from 5 to 15 wt. %, more preferably from 7 to 15 wt. % based on the weight of glass fibres.

The presence of an impregnating agent allows a good dispersion of the glass fibres within the polypropylene composition during downstream conversion processes, such as for example injection moulding. In addition to that the impregnating agent also couples the glass fibres to each other and to the sheath to a certain extent.

It is preferred to use an impregnating agent as defined in WO2009/080281. That is, the impregnating agent is non-volatile, has a melting point of at least about 20° C. below the melting point of the polypropylene compound sheath and has a viscosity of from 2.5 to 100 cS at application temperature. The viscosity of the impregnating agent is lower than 100 cS, preferably lower 5 than 75 cS and more preferably lower than 25 cS at application temperature. The viscosity of the impregnating agent is higher than 2.5 cS, preferably higher than 5 cS, and more preferably higher than 7 cS at the application temperature. An impregnating agent having a viscosity higher than 100 cS is difficult to apply to the continuous strand of glass fibres. Low viscosity is needed to facilitate good wetting performance of the glass fibres, but an impregnating agent having a viscosity lower than 2.5 cS is difficult to handle, e.g., the amount to be applied is difficult to control. The melting temperature of the impregnating agent is at least about 20° C., preferably at least 25° C. or at least 30° C. below the melting point of the polypropylene composition sheath. The application temperature of the impregnating agent is selected such that the desired viscosity range is obtained. The amount of impregnating agent that is applied depends inter alia on the thermoplastic polymer used for the sheath, the amount of glass fibres, the size (diameter) of the glass fibres of the continuous strand, and on the type of sizing that is on the surface of the glass fibres. According to the present invention, the amount of impregnating agent applied to the continuous strand of glass fibres should be higher than 0.5 wt. %, preferably higher than 2 wt. %, more preferably higher than 4 wt. %, more preferably higher than 6. wt % based on the weight of the glass fibres (including the sizing composition). The amount of impregnating agent should be lower than 20 wt. % preferably lower than 18 wt. %, more preferably lower than 15 wt. % more preferably lower than 12 wt. %. In general, a higher amount of glass fibres requires a higher amount of impregnating agent. A certain minimum amount of impregnating agent is desired to assist homogeneous dispersion of glass fibres in the thermoplastic polymer matrix during moulding. An excess of impregnating agent may result in decrease of mechanical properties of the moulded articles. Suitable examples of impregnating agents for use in combination with polypropylene as the material for the sheath may comprise highly branched poly(alpha-olefins), such as polyethylene waxes, modified low molecular weight polypropylenes, mineral oils, such as, paraffin or silicon and any mixtures of these compounds. Preferably, the impregnating agent comprises a highly branched poly(alpha-olefin) and, more preferably, the impregnating agent is a highly branched polyethylene wax. The wax may optionally be mixed with a hydrocarbon oil or wax like a paraffin oil to reach the desired viscosity. WO 2009/080281 discloses as an impregnating agent a blend of 30 wt. % Vybar 260 (hyper branched polymer supplied by Baker Petrolite) and 70 wt % Paralux oil (paraffin, supplied by Chevron). The term non-volatile means that the impregnating agent does not evaporate under the application and processing conditions applied. In the context of the present invention, "substantially solvent-free" means that the impregnating agent contains less than 10% by mass of solvent, preferably less than 5% by mass solvent. Most preferably, the impregnating agent does not contain any solvent. The impregnating agent may further be mixed with other additives known in the art.

In a more preferred embodiment the impregnating agent contains at least 70 wt. % of microcrystalline wax based on the weight of the impregnating agent. In that respect it is to be understood that the microcrystalline wax may be a single microcrystalline wax or a blend of several microcrystalline waxes. Microcrystalline waxes are known materials. In general a microcrystalline wax is a refined mixture of solid saturated aliphatic hydrocarbons, and produced by de-oiling certain fractions from the petroleum refining process. Microcrystalline waxes differ from refined paraffin wax in that the molecular structure is more branched and the hydrocarbon chains are longer (higher molecular weight). As a result the crystal structure of microcrystalline wax is much finer than paraffin wax, which directly impacts many of the mechanical properties of such materials. Microcrystalline waxes are tougher, more flexible and generally higher in melting point compared to paraffin wax. The fine crystalline structure also enables microcrystalline wax to bind solvents or oil and thus prevents the sweating out of compositions. Microcrystalline wax may be used to modify the crystalline properties of paraffin wax. Microcrystalline waxes are also very different from so called iso-polymers. First of all, microcrystalline waxes are petroleum based whereas iso-polymers are poly-alpha-olefins. Secondly iso-polymers have a very high degree of branching of above 95%, whereas the amount of branching for microcrystalline waxes generally lies in the range of from 40-80 wt. %. Finally, the melting point of iso-polymers generally is relatively low compared to the melting temperature of microcrystalline waxes. All in all, microcrystalline waxes form a distinct class of materials not to be confused either by paraffin or by iso-polymers. The remaining at most 30 wt % of impregnating agent may contain a natural or synthetic wax or an iso-polymer. Typical natural waxes are animal waxes such as bees wax, lanolin and tallow, vegetable waxes such as carnauba, candelilla, soy, mineral waxes such as paraffin, ceresin and montan. Typical synthetic waxes include ethylenic polymers such as polyethylene wax or polyol ether-ester waxes, chlorinated napthalenes and Fisher Tropsch derived waxes. A typical example of an iso-polymer, or hyper-branched polymer, is Vybar 260 mentioned above. In an embodiment the remaining part of the impregnating agent contains or consists of one or more of a highly branched poly-alpha-olefin, such as a polyethylene wax, paraffin. In a further preferred embodiment the impregnating agent comprises at least 80 wt %, more preferably at least 90 wt % or even at least 95 wt % or at least 99 wt % of microcrystalline wax. It is most preferred that the impregnating agent substantially consists of microcrystalline wax. In an embodiment the impregnating agent does not contain paraffin. The term substantially consists of is to be interpreted such that the impregnating agent comprises at least 99.9 wt. % of microcrystalline wax, based on the weight of the impregnating agent.

The microcrystalline wax preferably has one or more of the following properties:
- a drop melting point of from 60 to 90° C. as determined in accordance with ASTM D127
- a congealing point of from 55 to 90° C. as determined in accordance with ASTMD938
- a needle pen penetration at 25° C. of from 7 to 40 tenths of a mm as determined in accordance with ASTM D1321
- a viscosity at 100° C. of from 10 to 25 mPa·s as determined in accordance with ASTM D445
- an oil content of from 0 to 5 wt. % preferably from 0 to 2 wt % based on the weight of the microcrystalline wax as determined in accordance with ASTM D721

In an even more preferred embodiment the microcrystalline wax has all these properties in combination.

The skilled person will understand that the core of the pellet comprising the glass fibres and the impregnating agent will only be surrounded by the polypropylene compound sheath in the longitudinal direction. Hence, the core of the pellet is exposed to the surrounding at the two cutting planes, or cross sectional surfaces corresponding to the positions where the pellet was cut. It is for this reason that upon insufficient coupling of the glass fibres to the sheath the glass fibres may separate from the pellet resulting in free glass as explained above.

Method

The present invention is further directed to a method for the manufacture of a flame retardant long glass fibre reinforced polypropylene composition having a core containing glass fibres and a sheath of a polypropylene compound comprising a flame retardant composition and surrounding said core, said method comprising the steps of
a) providing at least one continuous glass multifibre strand,
b) optionally applying an impregnating agent to said continuous glass multifibre strand,
c) applying a sheath of polypropylene compound around the strand obtained in step b) so as to form a sheathed continuous multifibre strand,
wherein the flame retardant composition comprises a mixture of an organic phosphate compound, an organic phosphoric acid compound and zinc oxide.

The method may further comprise a step of cutting the sheathed continuous multifibre strand so as to form the pellets.

The method according to the invention is typically known as a wire-coating process. Wire-coating is carried out by passing the continuous glass multifibre strand (roving) through a wire-coating die. Said die is attached to an extruder which supplies molten polypropylene composition through an opening substantially perpendicular to the direction of the glass multifibre strand through the die. As such the thermoplastic polymer basically sheaths or encapsulates the glass multifibre strand which is the "wire" to be "coated". Such a process is also disclosed in WO 99/00543 and in WO 2009/080281, the essential difference between these disclosures being that WO 99/00543 does not require the application of impregnating agent prior to the sheathing with the thermoplastic polyolefin. In the process of the invention it is preferred that either one continuous glass multifibre strand is sheathed or two continuous glass multifibre strands are sheathed together. The latter being in particular of relevance form compositions having a relatively high amount of glass fibres, such as from 40-70 wt. % or 50-70 wt. %.

Although less preferred, instead of applying the impregnating agent "in line", use may also be made of rovings that already contain said impregnating agent.

The line speed of the process may be at least 100 m/min or at least 200 m/min or at least 300 m/min or at least 400 min. Generally the line speed may be from 100-600 m/min provided the cooling capacity of the production line is sufficient for cooling the sheathed strand to the desired cutting temperature.

Flame Retardancy

The flame retardant long glass fibre reinforced polypropylene composition according to the present invention preferably exhibits a UL-94 flame retardancy rating of V0 at 3.2 mm thickness, preferably a V0 rating at 2.0 mm thickness, most preferably a V0 rating at 1.6 mm thickness. The flame retardant long glass fibre reinforced polypropylene composition according to the invention preferably passes the UL94 5V rating at 3.2 mm thickness, more preferably it passes the UL94 5V rating at 2.0 mm thickness, tested on bars.

The flame retardant long glass fibre reinforced polypropylene composition according to the invention preferably exhibits a Glow Wire Flammability Index as measured according to IEC-60695-2-12 of at least 725° C. at 0.8 mm thickness.

The flame retardant long glass fibre reinforced polypropylene composition according to the invention preferably exhibits a comparative tracking index measured according to International Electrotechnical Commission standard IEC-60112/$3^{rd}$ of at least 600 Volts.

In order to get a UL-94 V0 rating at 1.6 mm thickness the inventors have found that:

for a glass content of 20 wt. % the amount of flame retardant composition should be at least about 15 wt. %, for a glass content of 30 wt. % the amount of flame retardant composition should be at least about 20 wt. % and for a glass content of 40 wt. % the amount of flame retardant composition should be at least about 25 wt. %

In other words, for compositions according to the invention having a UL94-V0 rating at 1.6 mm thickness, the amount of flame retardant material should be selected according to the following formula I $FR \geq 0.5 \times GF + 5$    I Wherein,
GF=amount of glass fibre in wt. %
FR=amount of flame retardant composition in wt. % provided the amount of glass fibres is at least 15 wt. %, preferably in the range of 20-40 wt. %.

Application

The flame retardant long glass fibre reinforced polypropylene composition according to the invention may be used for the manufacture of articles or structural parts by known down-stream processing techniques. Such techniques include injection moulding, extrusion moulding, compression moulding and the like.

Typical applications of the composition of the present invention are structural parts requiring a high stiffness.

For example the composition of the present invention can be used for the manufacture of automotive parts, like bumpers, instrument panel carriers, door modules, tailgates, front-end modules, gas pedal boxes, airbag housing, air conduits, sun-roof structures, battery-boxes and the like.

Alternatively the composition of the present invention can be used for the manufacture of rods, sheets, pipes or pipes forming the basic building blocks for any structural application either as automotive or non-automotive.

In addition the composition of the present invention may be used for the manufacture of domestic appliances like washing machines, wash dryers, electrical appliances like coffeemakers, toasters, refrigerators, vacuum cleaners and the like.

In a special embodiment the composition is used for the manufacture of supporting structures in solar applications. Such structures include but are not limited to building integrated solar panels or building integrated photo voltaic panels.

For the avoidance of doubt it should be understood that the composition according to the first aspect may, upon application, be diluted for example with other long glass fibre reinforced polypropylene compositions not containing a flame retardant composition, in order to set the total level of flame retardant composition and/or amount of glass fibres at the desired amount.

Second Aspect

In a second aspect the present invention is directed at a moulding composition comprising:

pellets of a long glass fibre reinforced polypropylene composition having a core containing glass fibres and a sheath of a first polypropylene compound surrounding said core, wherein the glass fibre reinforced polypropylene composition comprises from 10-70 wt. % of glass fibres and from 90-30 wt. % of polypropylene compound, based on the weight of the glass fibre reinforced polypropylene composition, said glass fibre reinforced polypropylene composition not containing a flame retardant composition, a flame retardant polypropylene dilution composition comprising a second polypropylene compound containing a flame retardant composition comprising a mixture of an organic phosphate compound, an organic phosphoric acid compound and zinc oxide.

With respect to the type of glass fibres, the type of first polypropylene compound and the amount and type of impregnating agent in the pellets of the long glass fibre reinforced polypropylene composition the description of the first aspect of the present invention shall apply, except for the flame retardant composition, which is excluded from the pellets according to the second aspect of the invention. Similarly the flame retardancy, the mechanical properties and the use of the moulding composition as described for the first aspect shall also apply to the second aspect of the present invention.

The flame retardant polypropylene dilution composition is preferably in the form of pellets based on a homogeneous mixture of the flame retardant composition and the second polypropylene compound.

In another preferred embodiment the flame retardant dilution composition consists of the pellets according to first aspect of the invention.

The polypropylene of the second polypropylene compound may be the same or different as the polypropylene of the first polypropylene compound and is preferably the same.

The advantage of the second aspect of the present invention is that it gives more production flexibility in that the amount of glass fibres as well as the amount of flame retardant in the final product manufactured from the moulding composition can be selected without a change in the glass fibre reinforced composition. In other words, standard and/or existing glass fibre reinforced polypropylene grades can be used.

In a further preferred embodiment of the second aspect the moulding composition comprises a third polypropylene compound not containing a flame retardant composition.

The polypropylene of the third polypropylene compound may be the same or different as the first or second polypropylene. By using a third polypropylene compound a converter has the most freedom in designing an end product wherein the mechanical properties, in terms of amount of glass fibres, and the flame retardancy in terms of amount of flame retardant composition can be selected using more or less standard components.

The third polypropylene compound is preferably in the form of pellets and is preferably a commercially available polypropylene material.

Third Aspect

In a third aspect the present invention is directed at a moulding composition comprising:
pellets according to the first aspect of the invention,
pellets of a dilution polypropylene composition containing a flame retardant composition comprising a mixture of an organic phosphate compound, an organic phosphoric acid compound and zinc oxide.

In this embodiment the moulding composition preferably comprises:
from 35-80 wt. % of polypropylene compound,
from 10-40 wt. % of glass fibres,
from 10-35 wt. % of a flame retardant composition,
the weight percentages being based on the weight of the moulding composition.

For the avoidance of doubt it should be understood that the total of polypropylene compound, glass fibres, impregnating agent and flame retardant composition is 100 wt. %.

In the third aspect the amount of flame retardant is the same as in the first aspect. That is to say, the amount of flame retardant composition is from 10-35 wt. % based on the weight of the moulding composition. Higher amounts, such as from 20-35 wt. % may be required for applications that need to be compliant with a UL-94 5V rating. For UL-94 V0 ratings lower amounts may suffice, depending also on the amount of glass fibres as explained herein.

An advantage of the invention in its third aspect is that it allows the manufacture of long glass fibre reinforced polypropylene compositions with a relatively high amount of glass fibre, yet an amount of flame retardant composition that is lower, such as for example from 5-15 wt. % or 5-10 wt. % on the basis of the long glass fibre reinforced polypropylene composition. As such a material that already has a certain minimum flame retardancy can be tuned in terms of both flame retardancy as well as glass fibre amount by adding the required amounts of flame retardant composition and/or dilution polypropylene.

With respect to the type of glass fibres, the type of polypropylene compound and the amount and type of impregnating agent in the pellets of the long glass fibre reinforced polypropylene composition the description of the first and/or second aspect of the present invention shall apply. Similarly the flame retardancy, the mechanical properties and the use of the moulding composition as described for the first and second aspect shall also apply to the third aspect of the present invention.

The present invention will now be further elucidated by the following non-limiting examples.

Flame Retardancy Measurement

The UL 94 flame-retardancy ratings were determined in accordance with UL 94: Standard for Tests for Flammability of Plastic Materials for Parts in Devices and Appliances, Fifth Edition, Oct. 29, 1996, revised Jun. 2, 2006, which is incorporated by reference into this specification. The UL 94 standard provides standardized and accepted (approved Jul. 28, 2010 by the American National Standards Institute (ANSI)) test methods and rating scales to assess and compare the flame-retardancy properties of plastic materials. The UL 94 standard includes six tests: Horizontal Burning Test (HB); 20 mm Vertical Burning Test (V-0, V-1, V-2); 125 mm Vertical Burning Test (5VA, 5VB); Radiant Panel Flame Spread Test; Thin Material Vertical Burning Test (VTM-0, VTM-1, VTM-2); and Horizontal Burning Foamed Material Test (HBF, HF-1, HF-2). The embodiments described in this specification are characterized by flame-retardancy ratings determined using the 20 mm Vertical Burning Test (V-0, V-1, V-2) and the 125 mm Vertical Burning Test on bars (5V).

The UL 94 flame-retardancy ratings determined in accordance with the UL 94 specification are reported with the thickness of the test specimen. Generally, thinner test specimens correlate with decreased flame-retardancy. Therefore, it is more difficult to achieve a UL 94 5V-A flame-retardancy rating with relatively thinner test specimen of a given material.

The present invention will now be explained on the basis by the following examples, which in no way should be considered as limiting the present invention.

Several flame retardant compositions were prepared and shown Tables 1 and 2. The amounts of glass fibres (glass), flame retardant composition (FR) and polypropylene (PP) and other (Other) are all in wt. % on the basis of the total weight of the composition.

The other components (other) of the compositions were identical for all examples E1-E17 and CE1-CE3 and consisted of additives, stabilisers and carbon black.

In Experiments CE1, CE2, CE3 no flame retardant composition was present.

In experiments E1, E6, E11, E12, and E17 the flame retardant composition was comprised in the sheath of the glass fibre filled polypropylene composition. In the other examples a flame retardant long glass fibre reinforced polypropylene composition was diluted with long glass fibre reinforced polypropylene composition of the same type (i.e. having a core-sheath structure), yet not containing a flame retardant. This dilution material was Stamax 30YK270 commercially available from SABIC.

The polypropylene was PP 513MNK10, a heterophasic propylene copolymer commercially available from SABIC and having a melt flow rate of about 70 g/10 min.

The glass multifibre strand (roving) is SE4230 available from 3B Fibre Glass Company. The glass fibres in the multifibre strand have a diameter of about 19 micrometer and having a density of about 3000 tex, which can be calculated to correspond to approximately 4000 fibres per multifibre strand.

The flame retardant composition in all examples was ADK STAB FP-2200S, available from Adeka Palmarole. This material is a mixture comprising piperazine pyrophosphate, phosphoric acid compound and zinc oxide.

The compositions were injection moulded on an Engel 90T with a standard three zone single screw with a diameter of 30 mm. The temperatures were set on 190 to 210° C. spread over the temperature zones. The present inventors observed that a melt temperature of higher than 220° C. needs to be avoided as that would be detrimental for the flame retardancy properties.

Flame retardancy rating is provided for each example.

TABLE 1

|  | CE1 | E1 | E2 | E3 | E4 | E5 | E6 | E7 | E8 | E9 | E10 | CE2 |
|---|---|---|---|---|---|---|---|---|---|---|---|---|
| FR | 0 | 33 | 25 | 20 | 17 | 15 | 27 | 25 | 20 | 19 | 14 | 0 |
| Glass | 30 | 30 | 30 | 30 | 30 | 30 | 40 | 40 | 40 | 40 | 40 | 20 |
| PP* | 67 | 34 | 42 | 47 | 50 | 52 | 30 | 33 | 37 | 38 | 43 | 77 |
| Other | 3 | 3 | 3 | 3 | 3 | 3 | 3 | 3 | 3 | 3 | 3 | 3 |
| UL rating | | | | | | | | | | | | |
| @ 1.6 | Fail | V0 | V0 | V0 | V0 | V0 | V0 | V0 | Fail | Fail | Fail | Fail |
| @ 2.0 | Fail | V0 | V0 | V0 | V0 | V0 | V0 | V0 | V2 | V2 | Fail | Fail |
| @ 2.5 | Fail | V0 | V0 | V0 | V0 | V0 | V0 | V0 | V1 | V2 | Fail | Fail |
| @ 3.2 | Fail | V0 | V0 | V0 | V0 | V0 | V0 | V0 | V0 | V1 | Fail | Fail |
| UL 5 V rating | | | | | | | | | | | | |
| @ 1.6 | Fail | Fail | Fail | Fail | Fail | Fail | Fail | Fail | Fail | Fail | Fail | Fail |
| @ 2.0 | Fail | Pass | Fail | Fail | Fail | Fail | Fail | Fail | Fail | Fail | Fail | Fail |
| @ 2.5 | Fail | Pass | Pass | Fail | Fail |  | Pass | Fail | Fail | Fail | Fail | Fail |
| @ 3.2 | Fail | Pass | Pass | Fail | Fail |  | Pass | Fail | Fail | Fail | Fail | Fail |

|  | E11 | E12 | E13 | E14 | E15 | E16 | CE3 | E17 | CE4 | CE5 | CE6 |
|---|---|---|---|---|---|---|---|---|---|---|---|
| FR | 38 | 25 | 20 | 18 | 15 | 13 | 0 | 27 | 15 | 20 | 25 |
| Glass | 20 | 20 | 20 | 20 | 20 | 20 | 30 | 30 | 0 | 0 | 0 |
| PP* | 39 | 52 | 57 | 59 | 62 | 64 | 67 | 40 | 84 | 79 | 74 |
| Other | 3 | 3 | 3 | 3 | 3 | 3 | 3 | 3 | 1 | 1 | 1 |
| UL rating | | | | | | | | | | | |
| @ 1.6 | V0 | V0 | V0 | V0 | V0 | Fail | Fail | V0 | Fail | V2 | V2 |
| @ 2.0 | V0 | V0 | V0 | V0 | V0 | V1 | Fail | V0 | V2 | V2 | V2 |
| @ 2.5 | V0 | | | | | | | | V2 | V2 | V1 |
| @ 3.2 | V0 | | | | | | | | V2 | V0 | V0 |
| UL 5 V rating | | | | | | | | | | | |
| @ 1.6 | Pass | Fail | Fail | Fail | Fail | Fail | | Fail | Fail | Fail | Fail |
| @ 2.0 | Pass | Pass | Fail | Fail | Fail | Fail | | Fail | | | |
| @ 2.5 | Pass | | | | | | | | | | Fail |
| @ 3.2 | Pass | | | | | | | | Fail | Fail | Pass |

The invention claimed is:

1. Pellets of a flame retardant, long glass fibre reinforced polypropylene composition having a core containing glass fibres and an impregnating agent, and a sheath of a polypropylene compound comprising a flame retardant composition and surrounding said core, wherein the flame retardant composition comprises a mixture of an organic phosphate compound, an organic phosphoric acid compound and zinc oxide, wherein the flame retardant glass fibre reinforced polypropylene composition has a UL-94 V0 rating at 3.2 mm, and wherein the glass fibres extend in the pellet in a longitudinal direction, and wherein the glass fibres have a length of between 95% and 105% of a length of the pellet; wherein the flame retardant composition comprises a mixture of piperazine pyrophosphate, phosphoric acid compound, and the zinc oxide.

2. Pellets according to claim 1, wherein the flame retardant glass fibre reinforced polypropylene composition comprises
from 25-80 wt. % of polypropylene compound,
from 10-40 wt. % of glass fibres,
from 10-35 wt. % of a flame retardant composition,
the weight percentages being based on the weight of the flame retardant glass fibre reinforced polypropylene composition.

3. Pellets according to claim 1, wherein the amount of impregnating agent is from 5 to 15 wt. % based on the weight of the glass fibres.

4. Pellets according to claim 1, wherein the melt flow rate of the polypropylene compound, measured in accordance with ISO 1133 (2.16 kg, 230° C.) is from 10-100 g/10 min.

5. Moulding composition comprising:
pellets of a long glass fibre reinforced polypropylene composition having a core containing glass fibres and an impregnating agent, and a sheath of a first polypropylene compound surrounding said core, wherein the glass fibre reinforced polypropylene composition comprises from 10-70 wt. % of glass fibres and from 90-30 wt. % of polypropylene compound, based on the weight of the glass fibre reinforced polypropylene composition, said glass fibre reinforced polypropylene composition not containing a flame retardant composition, wherein the flame retardant glass fibre reinforced polypropylene composition has a UL-94 V0 rating at 3.2 mm, and wherein the glass fibres extend in the pellet in a longitudinal direction, and wherein the glass fibres have a length of between 95% and 105% of a length of the pellet, and
a flame retardant polypropylene dilution composition comprising a second polypropylene compound containing a flame retardant composition comprising a mixture of an organic phosphate compound, an organic phosphoric acid compound and zinc oxide,
wherein the flame retardant composition comprises a mixture of piperazine pyrophosphate, phosphoric acid compound, and the zinc oxide.

6. The moulding composition of claim 5, wherein the flame retardant polypropylene dilution composition consists of the pellets of a flame retardant long glass fibre reinforced polypropylene composition having a core containing glass fibres and an impregnating agent, and a sheath of a polypropylene compound comprising a flame retardant composition and surrounding said core, wherein the flame retardant composition comprises a mixture of an organic phosphate compound, an organic phosphoric acid compound and zinc oxide.

7. The moulding composition of claim 5, wherein the core of the pellets not containing a flame retardant composition comprises said impregnating agent in an amount from 5 to 15 wt. % based on the weight of the glass fibres.

8. The moulding composition of claim 5, wherein the melt flow rate of the first polypropylene compound, measured in accordance with ISO 1133 (2.16 kg, 230° C.) is from 10-100 g/10 min.

9. Moulding composition comprising:
   pellets according to claim 1,
   pellets of a dilution polypropylene composition containing a flame retardant composition comprising a mixture of an organic phosphate compound, an organic phosphoric acid compound and zinc oxide.

10. The moulding composition of claim 9, wherein the moulding composition comprises:
    from 35-80 wt. % of polypropylene compound,
    from 10-40 wt. % of glass fibres,
    from 10-35 wt. % of a flame retardant composition,
    the weight percentages being based on the weight of the moulding composition.

11. Flame retardant long glass fibre reinforced polypropylene composition according to claim 1, having a UL94-V0 rating at 1.6 mm.

12. Pellets according to claim 1, having a UL94-V0 rating at 1.6 mm, wherein the amount of flame retardant composition is selected according to the following formula I $$FR \geq 0.5 \times GF + 5 \qquad \text{I}$$

wherein,
GF=amount of glass fibre in wt. %
FR=amount of flame retardant composition in wt. %
provided the amount of glass fibres is at least 15 wt %.

13. A method for manufacturing an article comprising moulding the pellets according to claim 1, form the moulded article.

14. Article obtained by moulding the pellets according to claim 1.

15. The article of claim 14 having a UL94-V0 rating at 1.6 mm.

16. The method of claim 13, wherein the article is an interior or exterior automotive article or is comprised in a housing for a building integrated solar panel or a building integrated photo-voltaic panel.

17. Pellets according to claim 1, having a UL94-V0 rating at a thickness of 2.0 mm.

* * * * *